United States Patent
Geary et al.

(10) Patent No.: US 8,954,111 B2
(45) Date of Patent: Feb. 10, 2015

(54) METHOD AND WIRELESS DEVICE FOR REDUCING POWER CONSUMPTION BY TRANSFERRING SERVICING OF A SIM CHANNEL TO A FIRST RADIO SYSTEM AND AT LEAST PARTIALLY SHUTTING DOWN A SECOND RADIO SYSTEM OF THE WIRELESS DEVICE

(75) Inventors: Stuart Ian Geary, Fleet (GB); Nguyen Quan Tat, Berkshire (GB); Andrew Bishop, Guildford (GB); Graham Alexander Charles, Fleet (GB); Roy Skovgaard Hansen, Dragor (DK)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/170,939

(22) Filed: Jun. 28, 2011

(65) Prior Publication Data

US 2013/0005394 A1    Jan. 3, 2013

(51) Int. Cl.
*H04W 88/06* (2009.01)
*H04W 52/02* (2009.01)

(52) U.S. Cl.
CPC ............ *H04W 52/028* (2013.01); *H04W 88/06* (2013.01); *H04W 52/0229* (2013.01); *Y02B 60/50* (2013.01)
USPC ..................... 455/552.1; 455/420; 455/422.1; 455/436; 455/558; 455/456.1; 370/328; 370/329; 370/331; 370/332

(58) Field of Classification Search
CPC .......... H04W 52/0229; H04W 52/028; H04W 88/06; Y02B 60/50

USPC ......................... 455/558, 458, 425, 525, 574; 379/433.09
See application file for complete search history.

(56) References Cited

U.S. PATENT DOCUMENTS

| | | | |
|---|---|---|---|
| 7,593,365 | B1 | 9/2009 | Delker et al. |
| 2005/0107109 | A1 | 5/2005 | Gunaratnam et al. |
| 2006/0030290 | A1 | 2/2006 | Rudolf et al. |

(Continued)

FOREIGN PATENT DOCUMENTS

| | | |
|---|---|---|
| EP | 1 679 917 A2 | 7/2006 |
| EP | 2 082 587 A1 | 7/2009 |

(Continued)

OTHER PUBLICATIONS

Combined Search and Examination Report from GB Application No. 1110967.5, dated Oct. 19, 2011, 4 pgs.

(Continued)

*Primary Examiner* — Babar Sarwar
(74) *Attorney, Agent, or Firm* — Stanton IP Law

(57) ABSTRACT

A wireless device has at least a first radio system for a first SIM channel and a second radio system for a second SIM channel. A processing system is arranged to determine whether a first of the first and second radio systems is capable of providing service for both of the first and second SIM channels currently being serviced by the first and second radio systems respectively. Servicing of the second SIM channel is transferred from the second radio system to the first radio system if it is determined that the first radio system is capable of providing service for both of first and second SIM channels. At least a part of the second radio system is shut down to reduce the power consumed by the second radio system after servicing of the second SIM channel has been transferred.

19 Claims, 2 Drawing Sheets

(56) References Cited

U.S. PATENT DOCUMENTS

| | | |
|---|---|---|
| 2007/0091847 A1 | 4/2007 | Lee |
| 2010/0173671 A1 | 7/2010 | Cha |
| 2010/0273524 A1 | 10/2010 | Bae et al. |
| 2010/0278117 A1 | 11/2010 | Sharma et al. |
| 2011/0077031 A1* | 3/2011 | Kim et al. ............... 455/458 |
| 2011/0117909 A1 | 5/2011 | Cao et al. |
| 2011/0269503 A1* | 11/2011 | Park et al. ............. 455/552.1 |
| 2013/0005290 A1 | 1/2013 | Geary et al. |
| 2013/0005291 A1 | 1/2013 | Geary et al. |

FOREIGN PATENT DOCUMENTS

| | | |
|---|---|---|
| EP | 2 302 973 A1 | 3/2011 |
| WO | WO 2008/063993 A1 | 5/2008 |
| WO | WO 2010/140781 A2 | 12/2010 |
| WO | WO 2011/041406 A1 | 4/2011 |

OTHER PUBLICATIONS

Combined Search and Examination Report from GB Application No. 1110968.3, dated Oct. 20, 2011, 6 pgs.

* cited by examiner

METHOD AND WIRELESS DEVICE FOR REDUCING POWER CONSUMPTION BY TRANSFERRING SERVICING OF A SIM CHANNEL TO A FIRST RADIO SYSTEM AND AT LEAST PARTIALLY SHUTTING DOWN A SECOND RADIO SYSTEM OF THE WIRELESS DEVICE

FIELD OF THE INVENTION

The present invention relates to a wireless device, a method of operating a wireless device and a computer program for operating a wireless device.

BACKGROUND OF THE INVENTION

A multi-SIM (subscriber identity module) wireless device, including particularly mobile devices such as mobile phones (including so-called "smart phones"), personal digital assistants, tablet and laptop computers, etc., can hold two or more SIM cards. Currently, such devices can typically hold two SIM cards, though phones that can hold three SIM cards are now available and it is likely that phones and other wireless devices that can hold more SIM cards will become available. It is mentioned here that there are proposals to replace SIM cards with SIM functionality provided by software in the device. Reference will be made in this specification generally to "SIM" to mean that part of a device that provides for the subscriber identity module functionality whether provided by a physical card, software elsewhere in the device, or any other suitable arrangement. In addition, for simplicity and brevity, reference will often be made in this specification to a dual-SIM device, which can operate with two networks and/or tariff arrangements, etc., but it will be understood that much of what is described herein can be applied to a multi SIM wireless device having in principle any number of SIMs for operating with a corresponding number of networks and/or tariff arrangements, etc.

Dual-SIM operation allows the use of two services without the need to carry two devices at the same time. For example, the same handset can be used for business and private use with separate numbers and bills. As another example, the same handset can be used for travel, with one SIM being for use in the home country and the other SIM being for the country visited. As another example, both SIMs may be used with the same network operator, for example to achieve a higher total bandwidth for data connections. As yet another example, the device may contain both cellular and non-cellular radios which are used for voice and data communication respectively using the different SIMs. In any event, using multiple SIMs allows the user to take advantage of different pricing plans for calls and text messages to certain destinations as well as mobile data usage, and/or to keep personal and business use separate for example, and/or to achieve higher bandwidth, and/or to obtain coverage across different networks using a single handset. With this multiple SIM functionality, the SIMs can in general be from any network operator. The embodiments described herein are particularly concerned with mobile wireless devices that have two (or more) SIMs and radio systems which can be used simultaneously, and thus allow for example a user to send or receive data whilst making a voice call, and/or to have plural voice calls active simultaneously, and/or to have plural data calls active simultaneously, all on the one device and using the separate radio systems.

A particular problem with a dual (or more) SIM device is the high level of power consumed by the device, particularly for those that duplicate the radio hardware, software, firmware, etc. This is the case even if one or more of the SIMs and its respective SIM channel is in so-called idle mode because even in this state, considerable power is consumed by the SIM channel, particularly by the receiver components (which in general will include the antenna(s), radio frequency system, processor system, etc. servicing the SIM channel for that SIM). This is because in an idle state, the SIM channel will typically be performing at least paging reception and mobility measurements, etc.

SUMMARY OF THE INVENTION

In accordance with a first aspect of the present invention, there is provided a method of operating a wireless device having at least a first radio system for a first SIM channel and a second radio system for a second SIM channel, the method comprising: determining that a first of first and second radio systems of a wireless device is capable of providing service for both of first and second SIM channels currently being serviced by the first and second radio systems respectively; transferring servicing of the second SIM channel from the second radio system to the first radio system if it is determined that the first radio system is capable of providing service for both of first and second SIM channels; and, after servicing of the second SIM channel has been transferred, shutting down at least a part of the second radio system to reduce the power consumed by the second radio system.

The present invention recognises that having two radio systems fully powered and operating in a wireless device when one radio system can service the needs of both SIM channels unnecessarily consumes power. By transferring operation for one SIM channel from its current radio system to the other radio system and shutting down at least part of the radio system that is no longer being used, significant power savings are made. For example, search procedures, memory retention operations, leakage through logic gates and clocks will all consume power when the receiver for that SIM channel is operating, and powering down at least some of these will save power. Preferably, as much of the radio system as possible is shut down and is shut down as far as possible, as discussed further below.

In an embodiment, the transferring of servicing the second SIM channel from the second radio system to the first radio system comprises transferring a SIM context for the second SIM channel from the second radio system to the first radio system. A SIM context can be regarded as the configuration and state information fully describing the ongoing operations for a particular SIM on a radio network. This can be transferred within a very short time period, which can largely be regarded as being instantaneous.

In an embodiment, the method comprises resuming the second radio system if it is determined that the first radio system becomes incapable of providing service for both of the first and second SIM channels, and then transferring servicing the second SIM channel from the first radio system to the second radio system.

In an embodiment, the transferring of servicing the second SIM channel from the first radio system to the second radio system comprises transferring a SIM context for the second SIM channel from the first radio system to the second radio system. Because the SIM context fully describes the ongoing operations for the SIM channel, the context can be continued "as is" without the need for initial cellular access procedures, which saves time and helps make the transition effectively invisible to the user.

In an embodiment, it is determined that the first radio system becomes incapable of providing service for both of the first and second SIM channels when at least one of the first and second SIM channels becomes used for an active voice call or an active data call. Other conditions may be used instead or in addition. For example, in practice, paging messages for the SIM channels may clash on occasion, so it may be set so that the second radio system is resumed if it is detected that the paging messages for the SIM channels clash once or a particular number of times in a row, or more than a certain number in a predetermined time period.

In an embodiment, it is determined that a first of the first and second radio systems of the wireless device is capable of providing service for both the first and second SIM channels when both SIM channels are in an idle state. An idle state is typically when the channel is not being used actively for a voice or data call for example. There may be other conditions when one radio system is capable of providing service for both the first and second SIM channels, such as even if one or both of the SIM channels is in some active connected state. Such will depend on for example the processing power of the components used in the device, the transmission/reception bandwidth required by the SIM channels, the bandwidth actually provided by the connected radio system, etc. Particular examples relevant to the last of these include where the device supports multi-cell or carrier aggregation operation (where contiguous or non-contiguous carriers can be combined across the same or different frequency bands), or uses receive diversity which is implemented with two separate radio frequency receive paths, where the receiver enhancements can be re-purposed for multi SIM operation.

According to a second aspect of the present invention, there is provided a wireless device, the device comprising: at least a first radio system for a first SIM channel and a second radio system for a second SIM channel; a processing system arranged to determine whether a first of the first and second radio systems is capable of providing service for both of the first and second SIM channels currently being serviced by the first and second radio systems respectively; the processing system being arranged to transfer servicing of the second SIM channel from the second radio system to the first radio system if it is determined that the first radio system is capable of providing service for both of first and second SIM channels; and, the processing system being arranged to shut down at least a part of the second radio system to reduce the power consumed by the second radio system after servicing of the second SIM channel has been transferred.

According to a third aspect of the present invention, there is provided a computer program comprising code such that when the computer program is executed on a computing device, the computing device is arranged to: determine that a first of first and second radio systems of a wireless device is capable of providing service for both of first and second SIM channels currently being serviced by the first and second radio systems respectively; transfer servicing of the second SIM channel from the second radio system to the first radio system if it is determined that the first radio system is capable of providing service for both of first and second SIM channels; and, after servicing of the second SIM channel has been transferred, shut down at least a part of the second radio system to reduce the power consumed by the second radio system.

There is also provided a processing system for a wireless device having at least a first radio system for a first SIM channel and a second radio system for a second SIM channel, the processing system being arranged to cause a said wireless device to carry to a method according as described above.

Further features and advantages of the invention will become apparent from the following description of preferred embodiments of the invention, given by way of example only, which is made with reference to the accompanying drawings.

DETAILED DESCRIPTION OF THE INVENTION

Again, for simplicity, reference will typically be made in the following description to a dual-SIM wireless device (which includes particularly mobile devices, including mobile phones (including so-called "smart phones"), personal digital assistants, tablet and laptop computers, etc.), which can hold or cater for two SIMs and correspondingly has two radio systems, one for each SIM. It will be understood however that these principles can be applied to a multi-SIM wireless device having more than two SIMs (and typically a corresponding number of radio systems).

Figure 1:
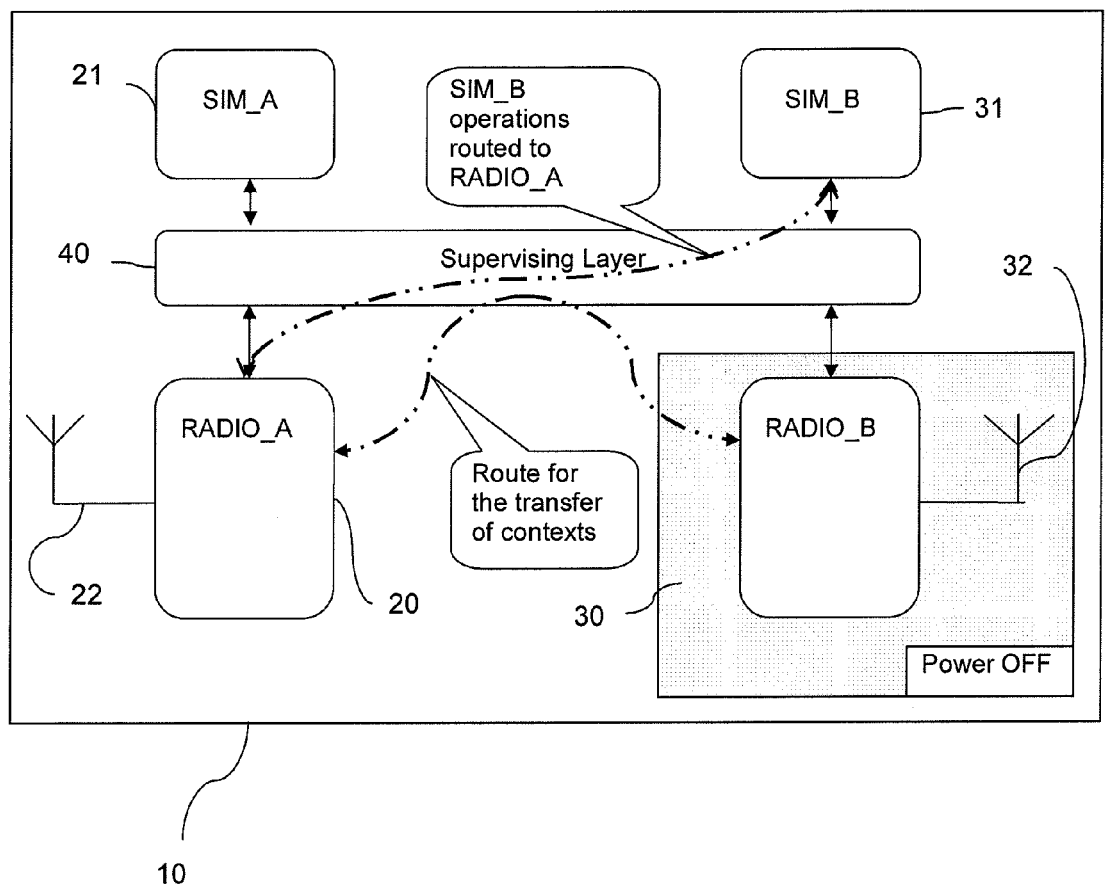
FIG. 1 shows schematically an example of a dual-SIM wireless device according to an embodiment of the present invention.

Referring initially to FIG. 1, a dual-SIM wireless device 10 has a radio front end 20,30 for each of two SIMs 21,31. Each radio front end 20,30 has its own respective antenna or set of antennas 22,32. Each radio front end 20,30 receives and transmits signals for the SIM channels corresponding to the respective SIMs 21,31 via circuitry 40 shown generically and schematically in the diagram. In general, the radio front ends 20,30 may provide the physical layer, baseband, MAC (media access control) and link layer control for the two SIM channels and the circuitry 40 may host the application layers of the device 10. Other arrangements are possible, such as the radio front ends 20,30 providing the physical layer and baseband control and the circuitry 40 or some other common part providing MAC and link layer control. As another alternative, there may be a common baseband block for both radio front ends 20,30. In any event, the circuitry 40 provides a supervisory layer for overall control of the radio front ends 20,30 and the associated circuitry as discussed further below. It will be understood that the radio front ends 20,30 and the circuitry 40 may in practice by implemented by one or more silicon chips or chipsets. The control may be typically as a software implementation, though a hardware or combination of software and hardware implementation is also possible. The term "radio system" will typically be used in this specification to refer to one or more of the radio front end, antenna(s), and relevant processing circuitry and software for a particular SIM channel (i.e. the hardware, software and/or firmware providing service in the device 10 for a particular SIM 21,31). In at least some circumstances, the term "radio system" is used to refer to all of the components for a particular SIM channel in the device 10. The two SIMs 21,31 and their respective channels and associated circuitry and antennas are generally designated by "A" and "B" in this description and the drawings.

Examples of operation of the device 10 will now be given with reference to FIGS. 2 and 3.

Figure 2:
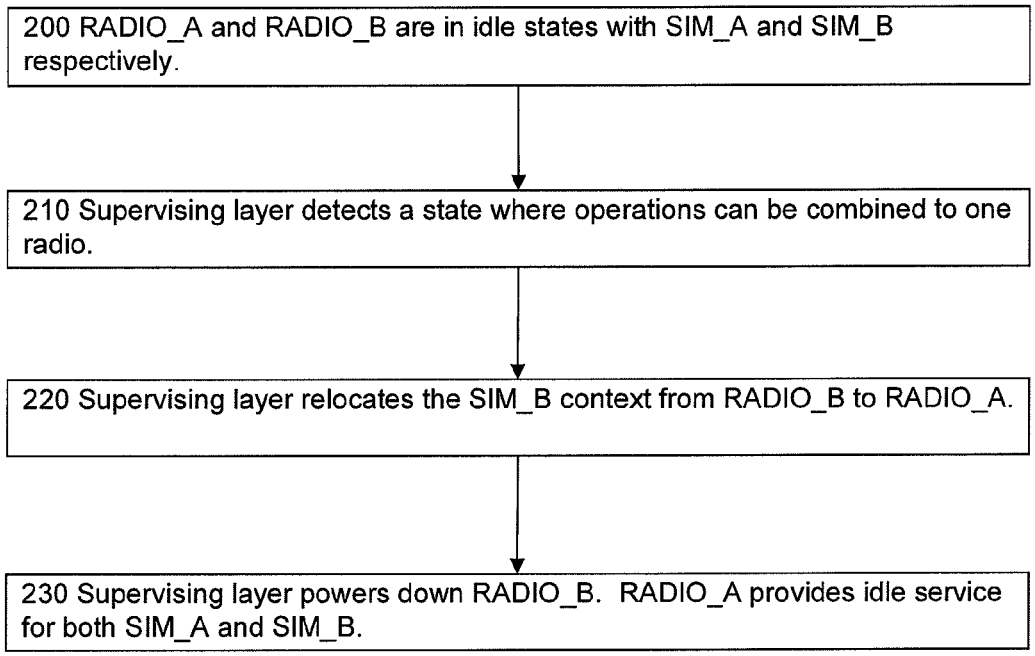
FIG. 2 shows a flow diagram of steps involved in an example of transferring servicing of a SIM channel from one radio system of the device to another radio system of the device that is already servicing another SIM channel.

Referring first to step 200 in FIG. 2, initially the two radio systems RADIO_A and RADIO_B are both providing service for their respective SIM cards SIM_A and SIM_B. In this example, the two SIM channels, and in particular the two radio systems RADIO_A and RADIO_B, are in an idle state. In an idle state, the SIM channel will typically be performing at least paging reception and mobility measurements, etc. and therefore consuming power.

In step 210, the supervisory layer in the circuitry 40 determines that the operation of the two SIM cards SIM_A and SIM_B can both be serviced by a single one of the radio systems RADIO_A and RADIO_B. In this example, this is achieved by the supervisory layer being aware that the two SIM channels are both in an idle state. In that case, in step 220, the supervisory layer relocates the SIM context for one of the SIM channels (e.g. for SIM_B) from the radio system servicing that channel (here RADIO_B) to the other radio system (here RADIO_A). A SIM context can be regarded as the configuration and state information fully describing the ongoing operations for a particular SIM on a radio network. In general, a SIM context includes: configuration information that is received in broadcast system information such as radio channels for the wireless device (often termed the user equipment or "UE") to use, timers, access method, measurement configurations and neighbour lists; ongoing state information such as the current discontinuous reception (DRX) timing and ongoing neighbour measurements; UE-specific configuration from the network, such as temporary identifiers, measurement configurations and neighbour lists; security parameters such as integrity and ciphering keys and counter values; etc. The context information may be stored in the SIM card itself or in the radio system.

After the SIM context has been transferred, in step 230 at least part of RADIO_B is shut down by the supervisory layer in the circuitry 40.

Figure 3:
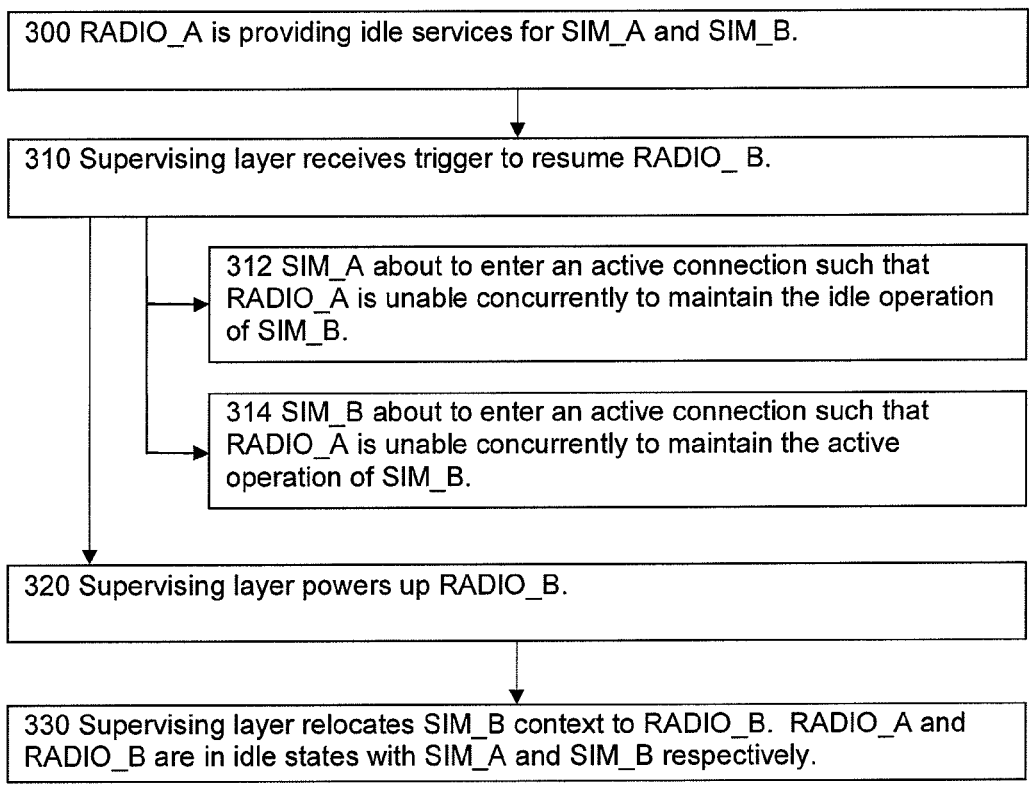
FIG. 3 shows a flow diagram of steps involved in an example of transferring servicing of a SIM channel from one radio system of the device that is servicing two SIM channels to another, unused radio system of the device.

Referring now to FIG. 3, at step 300, initially RADIO_B has been powered down and RADIO_A is providing service for both SIM channels. In this example RADIO_A is providing idle services for both SIM cards SIM_A and SIM_B.

At step 310, the supervisory layer in the circuitry 40 receives a trigger that indicates that RADIO_B should be resumed or fully powered up to be ready to resume providing service for SIM_B. A number of triggers may be used. In general, the trigger will indicate that the one radio system RADIO_A is no longer able to service both SIM channels for the two SIMs SIM_A and SIM_B. For example, as shown at 312, one trigger is that it is determined that the SIM_A initially serviced by RADIO_A is no longer idle and is about to enter an active connection, such as being involved in a voice or data call (as indicated for example by a change in its RRC (radio resource control) state), and that the one RADIO_A is not able to service that active connection and the idle operation of SIM_B. As another example, as shown at 314, a trigger may be that the SIM_B is no longer idle and is about to enter an active connection, such as being involved in a voice or data call (as indicated for example by a change in its RRC (radio resource control) state), and that the one RADIO_A is not able to service that active connection and the idle operation of SIM_A.

In any event, in step 320, RADIO_B is commanded by the supervisory layer in the circuitry 40 to resume or fully power up in order to resume providing service for SIM_B. In step 330, the supervisory layer relocates the SIM context for SIM-B back to the newly resumed RADIO_B. At this immediate point in time, RADIO_A and RADIO_B are in idle states with SIM_A and SIM_B respectively. However, once the SIM context for SIM-B has been successfully transferred back to RADIO_B, the active connection (such as a voice call) on SIM_A or SIM_B as the case may be can proceed. Once the active connection has ceased, the method can return to step 200 of FIG. 2 and one radio system at least partially shut down again to save power after its SIM context has been transferred to the other radio system.

It is mentioned above that (at least part of) the radio system that is not required is shut or powered down. Power saving methods which can be adopted will in practice depend on the specific hardware that is implemented and on certain functional criteria. For example, in general, processors, logic and receiver hardware can be put into a low power state by slowing down or suspending clock signals, although logic leakage typically still continues. To reduce consumption further, power domains may be implemented such that parts of the system can have power removed entirely. As mentioned, the device 10 may have entirely separate hardware (such as different baseband chips and radio front ends) for the two channels, and so one set can be fully powered down without affecting the other. If some parts are in common, for example the baseband logic of the two channels are on a common ASIC or other device, having different power domains for the logic or other hardware relating to the different channels may be particularly beneficial. Memory systems can be put into a low power retention state where the memory contents remain or can be shut down completely and the contents lost. A subset of the memories may be maintained to be available to enable a fast resume. By combinations of reducing the power state on some parts and removing power on other parts, the desired characteristics of reduced power consumption whilst maintaining a high resumption speed can be obtained and optimised for a particular implementation. It will be understood that in general, adding more power domains complicates the power supply arrangement and is minimised where possible.

In general terms, for this purpose, one or more of the components making up the radio system (such as the antenna(s), radio frequency system hardware components, processor system hardware components, etc.) for a SIM channel can be shut or powered down to a lower power state and preferably to the lowest power state that is available and appropriate. The "lowest power state" may be the state from which the radio system can be resumed in a reasonable time. For example and particularly in the context of the example trigger conditions mentioned above, the power state to which the radio system may be at least partially shut down is one that allows seamless context relocation as far as the network protocol operation is concerned. For example, depending on the circumstances, the time for full power to be resumed and the radio system to be fully in operation servicing its SIM again may be within protocol operations such as the paging reception cycle (typically 0.64 s in one example) or the time to respond to a page message (a few seconds). Depending on the design of the radio system, this may mean a deep sleep state with memory retention or a complete power down and cold boot. The relocation of the SIM context can be hidden inside the idle operations or the time to respond to a page for entering a connected state. In any event, the detailed nature and timing of operation of these aspects of the device are preferably such as to make the relocation of servicing of the SIM from one radio system to another transparent to the ongoing protocol operations and with no loss of service operation to the user of the wireless device. This is provided at the same time as reducing power usage.

The preferred embodiments of the present invention provide a dual SIM device that at least partially shuts or powers down one of its radio systems when the radio system for the other SIM is capable of providing service for both SIMs. This provides for significant power savings without affecting or compromising normal operation of the wireless device and particularly without any or any significant reduction in service for the user. The powered-down radio system is resumed or powered up as necessary or desirable. To achieve fast transfers of servicing of a SIM channel from one radio system to another, the SIM context for the relevant SIM is transferred. As the SIM context fully describes the ongoing operations for the SIM channel, the context can be continued "as is" without the need for initial cellular access procedures, which saves time and helps make the transition invisible to the user.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of processes according to the invention. The carrier may be any entity or device capable of carrying the program. For example, the carrier may comprise a storage medium, such as a ROM, for example a CD ROM or a semiconductor ROM, or a magnetic recording medium, for example a floppy disk or hard disk.

The above embodiments are to be understood as illustrative examples of the invention. Further embodiments of the invention are envisaged. For example, it is mentioned for the example above that the supervisory layer in the circuitry 40 determines that the operation of the two SIMs SIM_A and SIM_B can both be serviced by a single one of the radio systems RADIO_A and RADIO_B when the two SIM channels are both in an idle state. However, in general, there may be other cases when one radio system is capable of providing service for both the first and second SIM channels, such as even if one of the SIM channels is in some active connected state. Such will depend on for example the processing power of the components used in the device, the transmission/reception bandwidth required by the SIM channels and the bandwidth actually provided by the one connected radio system, etc. As another example, more than two SIMs and more than two radio systems may be employed in the device.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of operating a wireless device having at least a first radio system for a first subscriber identity module (SIM) channel and a second radio system for a second SIM channel, the method comprising:
   determining from the first and second SIM channels being in an idle state that the first radio system is configured to provide service for both the first SIM channel and the second SIM channel that are currently serviced by the first and second radio systems respectively;
   transferring servicing of the second SIM channel from the second radio system to the first radio system including transferring a SIM context for the second SIM channel from the second radio system to the first radio system when it is determined that the first radio system is configured to provide service for both the first SIM channel and the second SIM channel, wherein the SIM context includes configuration and state information that describes ongoing operations of the second SIM channel including temporary identifiers and security parameters of the wireless device; and,
   after servicing of the second SIM channel has been transferred, shutting down at least a part of the second radio system to reduce the power consumed by the second radio system.

2. The method according to claim 1, comprising resuming the second radio system when it is determined that the first radio system becomes incapable of providing service for both of the first and second SIM channels, and then transferring servicing the second SIM channel from the first radio system to the second radio system.

3. The method according to claim 2, wherein the transferring of servicing the second SIM channel from the first radio system to the second radio system comprises transferring the SIM context for the second SIM channel from the first radio system to the second radio system.

4. The method according to claim 2, wherein it is determined that the first radio system becomes incapable of providing service for both of the first and second SIM channels when at least one of the first and second SIM channels becomes used for an active voice call or an active data call.

5. The method according to claim 1, wherein the wireless device comprises one of a smart phone, a personal digital assistant, a tablet computer and a laptop computer.

6. The method according to claim 1, wherein the SIM context for the second SIM channel is stored in a physical Subscriber Identity Module (SIM).

7. The method according to claim 1, wherein the SIM context for the second SIM channel is transferred from stored software that implements a Subscriber Identity Module (SIM).

8. A wireless device, the device comprising:
   at least a first radio system for a first subscriber identity module (SIM) channel and a second radio system for a second SIM channel;
   a processing system arranged to determine whether from the first and second SIM channels being in an idle state that the first radio system is configured to provide service for both the first and second SIM channels that are currently being serviced by the first and second radio systems respectively;
   the processing system being arranged to transfer servicing of the second SIM channel from the second radio system to the first radio system including transfer of a SIM context for the second SIM channel from the second radio system to the first radio system when it is determined that the first radio system is configured to provide service for both the first SIM channel and the second SIM channel, wherein the SIM context includes configuration and state information that describes ongoing operations of the second SIM channel including temporary identifiers and security parameters of the wireless device; and,
   the processing system being arranged to shut down at least a part of the second radio system to reduce the power consumed by the second radio system after servicing of the second SIM channel has been transferred.

9. The device according to claim 8, wherein the processing system is arranged to resume the second radio system when the processing system determines that the first radio system becomes incapable of providing service for both of the first and second SIM channels, the processing system being arranged to then transfer servicing the second SIM channel from the first radio system to the second radio system.

10. The device according to claim 9, wherein the processing system is arranged to transfer servicing the second SIM channel from the first radio system to the second radio system by transferring the SIM context for the second SIM channel from the first radio system to the second radio system.

11. The device according to claim 9, wherein the processing system is arranged to determine that the first radio system becomes incapable of providing service for both of the first and second SIM channels when at least one of the first and second SIM channels becomes used for an active voice call or an active data call.

12. The wireless device according to claim 8, wherein the wireless device comprises one of a smart phone, a personal digital assistant, a tablet computer and a laptop computer.

13. The wireless device according to claim 8, wherein the SIM context for the second SIM channel is stored in a physical Subscriber Identity Module (SIM).

14. The wireless device according to claim 8, wherein the SIM context for the second SIM channel is transferred from stored software that implements a Subscriber Identity Module (SIM).

15. A non-transitory storage medium that stores a computer program comprising code such that when the computer program is executed on a computing device having at least a first radio system for a first subscriber identity module (SIM) channel and a second radio system for a second SIM channel, the computing device is arranged to:
- determine from the first and second SIM channels being in an idle state that the first radio system is configured to provide service for both the first SIM channel and second the SIM channel that are currently serviced by the first and second radio systems respectively;
- transfer servicing of the second SIM channel from the second radio system to the first radio system including transfer of a SIM context for the second SIM channel from the second radio system to the first radio system when it is determined that the first radio system is configured to provide service for both the first SIM channel and second SIM channel, wherein the SIM context includes configuration and state information that describes ongoing operations of the second SIM channel including temporary identifiers and security parameters of the wireless device; and,
- after servicing of the second SIM channel has been transferred, shut down at least a part of the second radio system to reduce the power consumed by the second radio system.

16. The storage medium according to claim 15, wherein the code is such that the second radio system is resumed when it is determined that the first radio system becomes incapable of providing service for both of the first and second SIM channels, and the code is further such that servicing the second SIM channel is then transferred from the first radio system to the second radio system.

17. The storage medium according to claim 16, wherein the code is such that the transferring of servicing the second SIM channel from the first radio system to the second radio system comprises transferring the SIM context for the second SIM channel from the first radio system to the second radio system.

18. The storage medium according to claim 16, wherein the code is such that it is determined that the first radio system becomes incapable of providing service for both of the first and second SIM channels when at least one of the first and second SIM channels becomes used for an active voice call or an active data call.

19. The storage medium according to claim 15, wherein the computing device comprises one of a smart phone, a personal digital assistant, a tablet computer and a laptop computer.

* * * * *